United States Patent
Begaint et al.

(10) Patent No.: US 12,537,979 B2
(45) Date of Patent: Jan. 27, 2026

(54) METHOD AND AN APPARATUS FOR ENCODING/DECODING IMAGES AND VIDEOS USING ARTIFICIAL NEURAL NETWORK BASED TOOLS

(71) Applicant: InterDigital VC Holdings, Inc., Wilmington, DE (US)

(72) Inventors: Jean Begaint, Menlo Park, CA (US); Fabien Racape, San Francisco, CA (US); Simon Feltman, Sunnyvale, CA (US); Akshay Pushparaja, San Jose, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 185 days.

(21) Appl. No.: 18/285,953

(22) PCT Filed: Apr. 13, 2022

(86) PCT No.: PCT/US2022/024558
§ 371 (c)(1),
(2) Date: Oct. 6, 2023

(87) PCT Pub. No.: WO2022/221374
PCT Pub. Date: Oct. 20, 2022

(65) Prior Publication Data
US 2024/0380929 A1     Nov. 14, 2024

Related U.S. Application Data

(60) Provisional application No. 63/174,105, filed on Apr. 13, 2021.

(51) Int. Cl.
*H04N 19/91*     (2014.01)
*G06V 10/82*     (2022.01)
*H04N 19/70*     (2014.01)

(52) U.S. Cl.
CPC ............. *H04N 19/91* (2014.11); *G06V 10/82* (2022.01); *H04N 19/70* (2014.11)

(58) Field of Classification Search
CPC ...... H04N 19/91; H04N 19/50; H04N 19/184; G06V 10/82; G06N 3/045
See application file for complete search history.

(56) References Cited

U.S. PATENT DOCUMENTS

| | | | |
|---|---|---|---|
| 11,893,762 B2* | 2/2024 | Ryder | H04N 19/124 |
| 2017/0011279 A1* | 1/2017 | Soldevila | G06V 30/226 |

(Continued)

OTHER PUBLICATIONS

"Infrastructure of audiovisual services—Coding of moving video—Versatile Video Coding", International Telecommunication Union, ITU-T Telecommunication Standardization Sector of ITU, Series H: Audiovisual and Multimedia Systems, Recommendation ITU-T H.266, Aug. 2020, 516 pages.

(Continued)

*Primary Examiner* — Fabio S Lima
(74) *Attorney, Agent, or Firm* — Condo Roccia Koptiw LLP

(57) ABSTRACT

Methods and apparatuses for encoding/decoding an image or a video using neural network are disclosed. In some embodiments, side-information is decoded from a bitstream that allows for adapting a first neural network-based decoder, the decoded side-information and coded data representative of an image or a video obtained from the bitstream or a separate bitstream are provided as inputs to the first neural-network-based decoder and a reconstructed image or video is obtained from an output of the first neural network-based decoder.

20 Claims, 14 Drawing Sheets

(56) References Cited

U.S. PATENT DOCUMENTS

| | | | |
|---|---|---|---|
| 2017/0011280 A1* | 1/2017 | Soldevila | G06V 10/454 |
| 2020/0304802 A1 | 9/2020 | Habibian et al. | |
| 2021/0166013 A1* | 6/2021 | Tensmeyer | G06N 3/045 |
| 2021/0295822 A1* | 9/2021 | Tomkins | G06F 16/3338 |
| 2023/0269387 A1* | 8/2023 | Cricrì | G06N 3/0455 |
| | | | 375/240.03 |
| 2023/0298219 A1* | 9/2023 | Galpin | H04N 19/61 |
| | | | 382/232 |
| 2023/0396801 A1* | 12/2023 | Racape | H04N 19/42 |
| 2024/0037802 A1* | 2/2024 | Solovyev | H04N 19/117 |

OTHER PUBLICATIONS

"Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Habibian et al., "Video Compression With Rate-Distortion Autoencoders", Cornell University Library, Electrical Engineering and Systems Science, Image and Video Processing, arXiv:1908.05717, Aug. 14, 2019, 14 pages.

Agustsson et al., "Scale-space flow for end-to-end optimized video compression", Institute of Electrical and Electronics Engineers (IEEE), 2020 IEEE/CVF Conference on Computer Vision and Pattern Recognition (CVPR), Seattle, Washington, USA, Jun. 13, 2020, 10 pages.

Balle et al., "Variational Image Compression with a Scale Hyperprior", ICLR 2018 Conference Track, 6th International Conference on Learning Representations, Apr. 30, 2018, 47 pages.

"Infrastructure of audiovisual services—Coding of moving video—Information Technology—Generic coding of moving pictures and associated audio information: Video", International Telecommunication Union, ITU-T Telecommunication Standardization Sector of ITU, Series H: Audiovisual and Multimedia Systems, Recommendation ITU-T H.262, Feb. 2000, 220 pages.

Ding et al., "Advances in Video Compression System Using Deep Neural Network: A Review and Case Studies", Institute of Electrical and Electronics Engineers (IEEE), Proceedings of the IEEE, vol. 109, Issue 9, Sep. 2021, 28 pages.

Wang et al., "Deep Neural Networks in Image and Video Compression", International Organization for Standardization, ISO/IEC JTC1/SC29/WG11, Coding of Moving Pictures and Audio, MPEG2020/M53700, Online, Apr. 2020, 12 pages.

"Infrastructure of audiovisual services—Coding of moving video—Conformance Specification for ITU-T H.265 High Efficiency Video Coding", International Telecommunication Union, Telecommunication Standardization Sector of ITU, Series H: Audiovisual and Multimedia Systems, Recommendation ITU-T H.265.1, Oct. 2014, 42 pages.

Yang et al., "CondConv: Conditionally Parameterized Convolutions for Efficient Inference", Neural Information Processing Systems (NeurIPS), 33rd Conference on Neural Information Processing Systems, NeurIPS 2019, Vancouver, Canada, Dec. 8, 2019, 12 pages.

* cited by examiner

METHOD AND AN APPARATUS FOR ENCODING/DECODING IMAGES AND VIDEOS USING ARTIFICIAL NEURAL NETWORK BASED TOOLS

CROSS REFERENCE TO RELATED APPLICATIONS

This application is a U.S. National Stage Application under 35 U.S.C. § 371 of International Patent Application No. PCT/US2022/024558, filed Apr. 13, 2022, which claims the benefit of U.S. Provisional Patent Application No. 63/174,105, filed Apr. 13, 2021, which is incorporated herein by reference in its entirety.

TECHNICAL FIELD

At least one of the present embodiments generally relates to a method or an apparatus for compression of images and videos using Artificial Neural Network (ANN) based tools.

BACKGROUND

The Joint Video Exploration Team (JVET) between ISO/MPEG and ITU is currently studying tools to replace some modules of the latest standard H.266/VVC, as well as the replacement of the whole structure by end-to-end auto-encoder methods.

SUMMARY

At least one of the present embodiments generally relates to a method or an apparatus in the context of the compression of images and videos using novel Artificial Neural Network (ANN)-based tools.

According to a first aspect, there is provided a method. The method comprises decoding from a bitstream, side-information for adapting a first neural network-based decoder, providing as inputs to the first neural-network-based decoder the decoded side-information and coded data representative of an image or a video obtained from the bitstream or a separate bitstream, obtaining from an output of the first neural network-based decoder, a reconstructed image or video.

According to a second aspect, there is provided a method. The method comprises obtaining from a first neural-network encoder at least one first latent comprising coded data representative of an image or a video, providing the at least one first latent to a second neural-network encoder, obtaining from the second neural-network encoder, at one second latent comprising side-information for adapting a first neural network-based decoder when decoding the at least one first latent, generating at least one bitstream comprising the at least one first latent and the at least one second latent.

According to another aspect, there is provided a method, which comprises decoding a bitstream comprising coded data representative of an image or a video, wherein decoding comprises decoding from the bitstream a syntax element indicating whether an adaptation of a first neural network-based decoder is used for decoding at least one latent obtained from the bitstream.

According to another aspect, there is provided a method, which comprises coding in a bitstream an image or a video, wherein coding the image or video comprises coding in the bitstream data representative of the image or video using a first neural-network encoder, coding in the bitstream a syntax element indicating whether an adaptation of a first neural network-based decoder is used for decoding from the bitstream the data representative of the image or video.

According to another aspect, there is provided an apparatus. The apparatus comprises a processor. The processor can be configured to implement the general aspects by executing any of the described methods.

According to another general aspect of at least one embodiment, there is provided a device comprising an apparatus according to any of the decoding embodiments; and at least one of (i) an antenna configured to receive a signal, the signal including a video block or image, (ii) a band limiter configured to limit the received signal to a band of frequencies that includes the video block or image, or (iii) a display configured to display an output representative of a video block or image.

According to another aspect of at least one embodiment, there is provided a non-transitory computer readable medium containing data content generated according to any of the described encoding embodiments or variants.

According to another aspect of at least one embodiment, there is provided a signal comprising video data generated according to any of the described encoding embodiments or variants.

According to another aspect of at least one embodiment, a bitstream is formatted to include data content generated according to any of the described encoding embodiments or variants.

According to another aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, the different aspects can be combined and interchanged to provide further aspects. Moreover, the aspects can be combined and interchanged with aspects described in earlier filings as well.

The aspects described and contemplated herein can be implemented in many different forms. Some embodiments are discussed below with respect to FIGS. 1-3, but other embodiments are contemplated and the discussion of FIGS. 1-3 should not be considered as limiting the breadth of such implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding image or video data according to any of the methods described, and/or a computer readable storage medium having stored thereon a bitstream generated according to any of the methods described.

Figure 1:
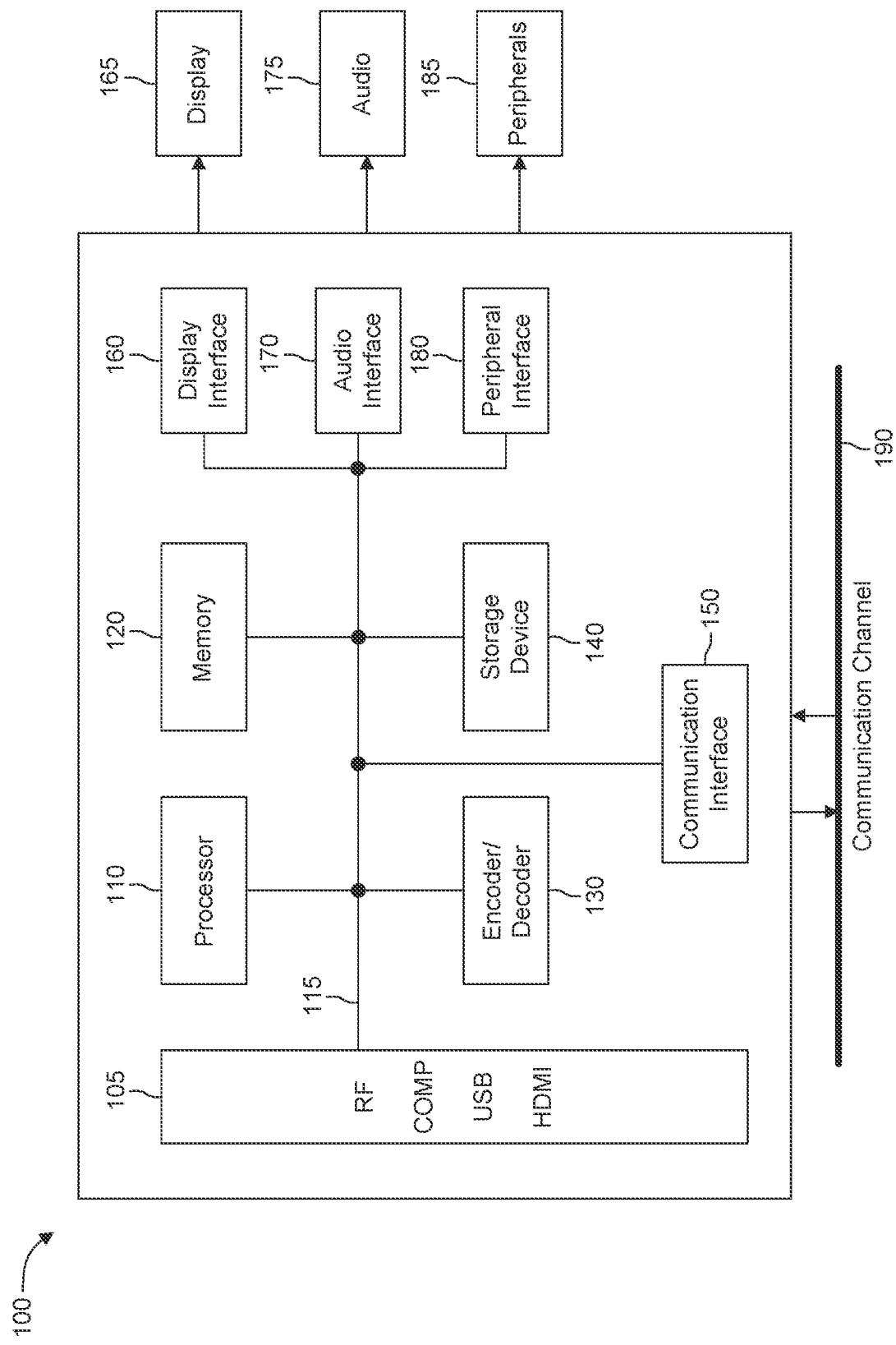
FIG. 1 is a block diagram of a system within which aspects of the present embodiments may be implemented.

FIG. 1 is a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In some embodiments, memory inside of the processor 110 and/or the encoder/decoder module 130 is used to store instructions and to provide working memory for processing that is needed during encoding or decoding. In other embodiments, however, a memory external to the processing device (for example, the processing device can be either the processor 110 or the encoder/decoder module 130) is used for one or more of these functions. The external memory can be the memory 120 and/or the storage device 140, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a standard being developed by JVET).

The input to the elements of system 100 can be provided through various input devices as indicated in block 105.

Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1, include composite video.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the data-stream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the Inter-IC (I2C) bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed, or otherwise provided, to the system 100, in various embodiments, using a wireless network such as a Wi-Fi network, for example IEEE 802.11 (IEEE refers to the Institute of Electrical and Electronics Engineers). The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105. As indicated above, various embodiments provide data in a non-streaming manner. Additionally, various embodiments use wireless networks other than Wi-Fi, for example a cellular network or a Bluetooth network.

The system 100 can provide an output signal to various output devices, including a display 165, speakers 175, and other peripheral devices 185. The display 165 of various embodiments includes one or more of, for example, a touchscreen display, an organic light-emitting diode (OLED) display, a curved display, and/or a foldable display. The display 165 can be for a television, a tablet, a laptop, a cell phone (mobile phone), or other device. The display 165 can also be integrated with other components (for example, as in a smart phone), or separate (for example, an external monitor for a laptop). The other peripheral devices 185 include, in various examples of embodiments, one or more of a stand-alone digital video disc (or digital versatile disc) (DVR, for both terms), a disk player, a stereo system, and/or a lighting system. Various embodiments use one or more peripheral devices 185 that provide a function based on the output of the system 100. For example, a disk player performs the function of playing the output of the system 100.

In various embodiments, control signals are communicated between the system 100 and the display 165, speakers 175, or other peripheral devices 185 using signaling such as AV.Link, Consumer Electronics Control (CEC), or other communications protocols that enable device-to-device control with or without user intervention. The output devices can be communicatively coupled to system 100 via dedicated connections through respective interfaces 160, 170, and 180. Alternatively, the output devices can be connected to system 100 using the communications channel 190 via the communications interface 150. The display 165 and speakers 175 can be integrated in a single unit with the other components of system 100 in an electronic device such as, for example, a television. In various embodiments, the display interface 160 includes a display driver, such as, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

The embodiments can be carried out by computer software implemented by the processor 110 or by hardware, or by a combination of hardware and software. As a non-limiting example, the embodiments can be implemented by one or more integrated circuits. The memory 120 can be of any type appropriate to the technical environment and can be implemented using any appropriate data storage technology, such as optical memory devices, magnetic memory devices, semiconductor-based memory devices, fixed memory, and removable memory, as non-limiting examples. The processor 110 can be of any type appropriate to the technical environment, and can encompass one or more of microprocessors, general purpose computers, special purpose computers, digital signal processors (DSPs), and processors based on a multi-core architecture, as non-limiting examples.

Figure 2:
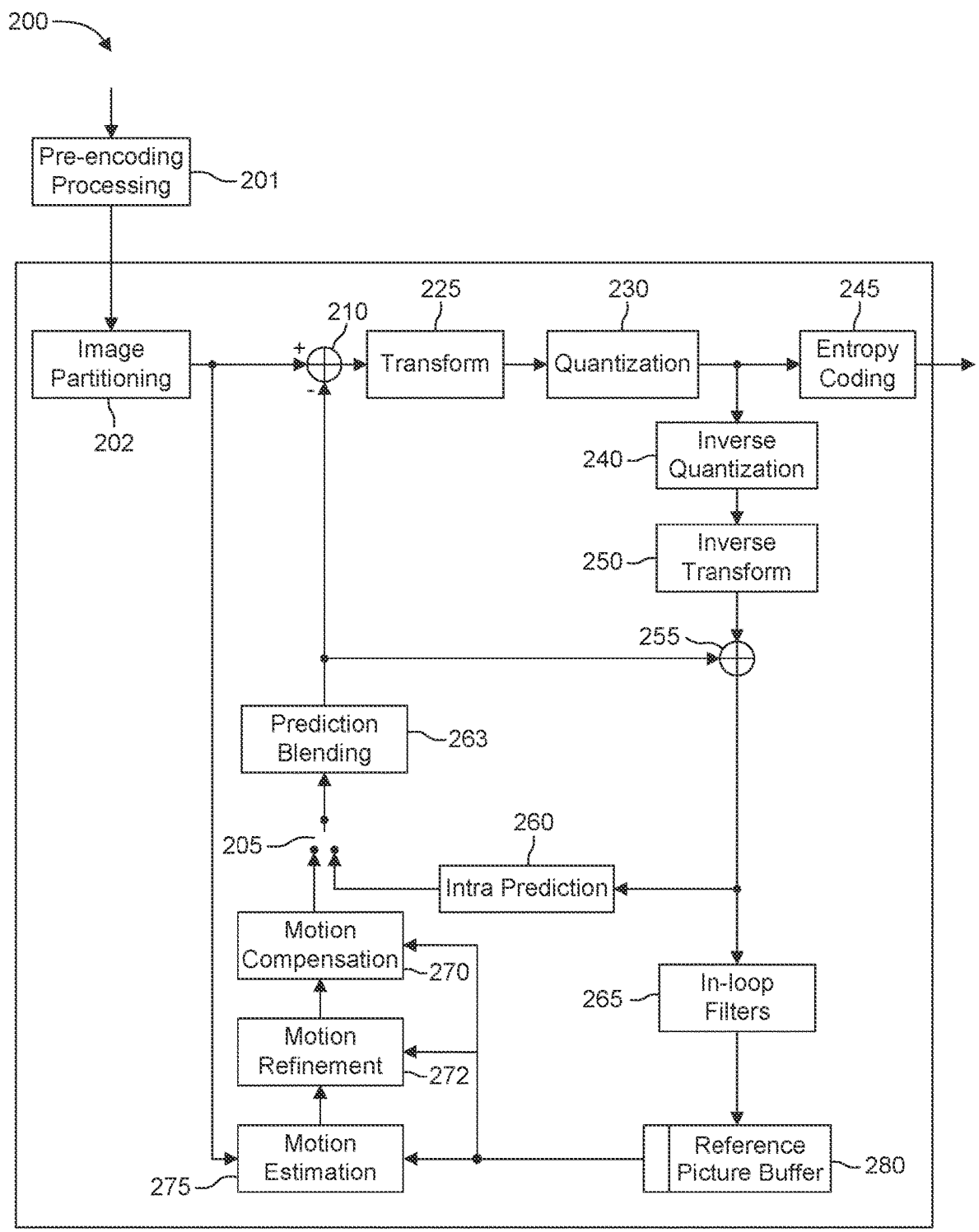
FIG. 2 is a block diagram of an embodiment of a video encoder.

FIG. 2 is block diagram of an example video encoder 200, such as a HEVC encoder. FIG. 2 may also illustrate an encoder in which improvements are made to the HEVC standard or an encoder employing technologies similar to HEVC, such as a VVC encoder under development by JVET.

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods.

Prediction residuals are calculated, for example, by subtracting (210) the predicted block from the original image block. The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
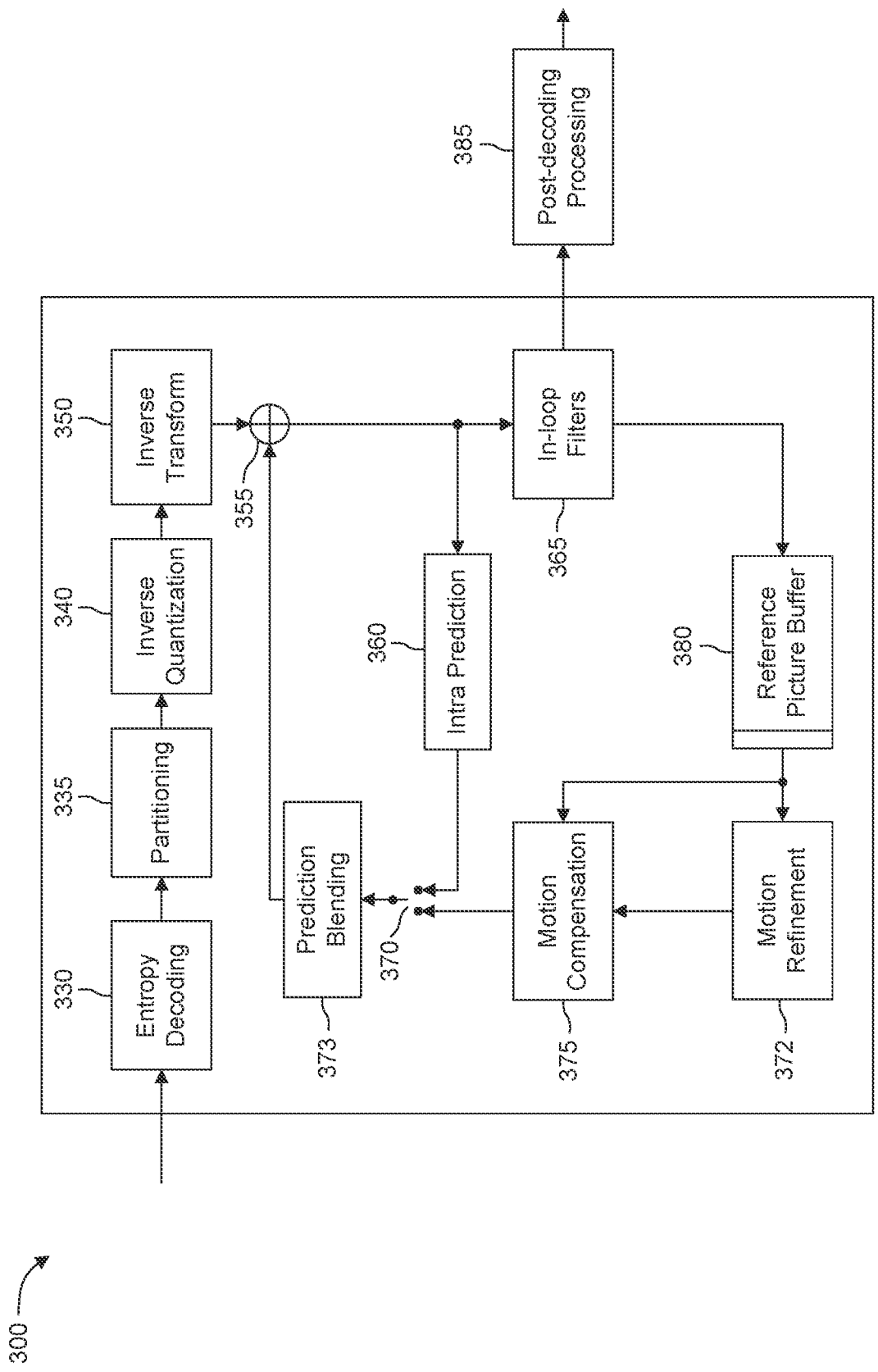
FIG. 3 is a block diagram of an embodiment of a video decoder.

FIG. 3 is a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

According to an embodiment, all or parts of the video encoder and decoder described in reference to FIG. 1, FIG. 2 and FIG. 3 may be implemented using Artificial Neural Networks (ANN).

In recent years, novel image and video compression methods based on neural networks have been developed. Contrary to traditional methods which apply pre-defined prediction modes and transforms, Artificial Neural Network (ANN)-based methods rely on parameters that are learned on a large dataset during training, by iteratively minimizing a loss function. In a compression case, the loss function describes both an estimation of the bitrate of the encoded bitstream, and the performance of the decoded content. Traditionally the quality of the reconstructed image is optimized, for example based on the measure of the signal distortion or an approximation of the human-perceived visual quality.

Figure 4:
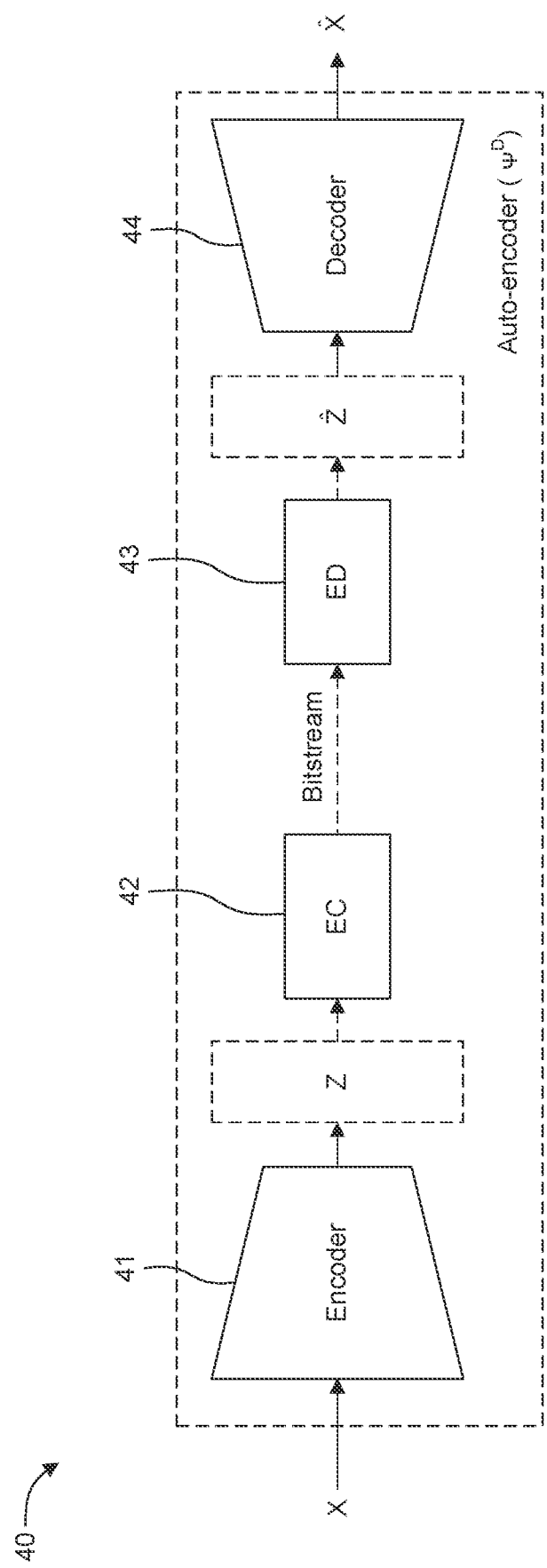
FIG. 4 is a block diagram of an embodiment of an auto-encoder based on an Artificial Neural Network.

In FIG. 4, an exemplary block diagram of an end-to-end compression system 40 is shown. The input X to the encoder part of the network may comprise:
- an image or frame of a video,
- a part of an image
- a tensor representing a group of images
- a tensor representing a part (crop) of a group of images.

In each case, the input can have one or multiple components, e.g.: monochrome, RGB or YCbCr components.

The input tensor X is fed into the encoder network 41.

The encoder network 41 is usually a sequence of convolutional layers with activation functions. Large strides in the convolutions or space-to-depth operations can be used (reshaping and permutation, for example a tensor of size (N, H, W) is reshaped and permuted to (N*2*2, H//2, W//2)) to reduce the spatial resolution while increasing the number of channels. The encoder network 41 can be seen as a learned transform.

The output of the encoder network 41, the "features map" or "latent" Z, is quantized (not shown) and entropy coded (EC, 42) as a binary stream (bitstream) for storage or transmission.

The bitstream is entropy decoded (ED, 43) to obtain $\hat{Z}$, the reconstructed version of Z. The decoder network 44 generates $\hat{X}$, an approximation of the original X tensor from the latent $\hat{Z}$. The decoder network 44 is usually a sequence of up-sampling convolutions (e.g.: "deconvolutions" or convolutions followed by upsampling filters) or depth-to-space operations. The decoder network 44 can be seen as a learned inverse transform, or a denoising and generative transform.

More sophisticated architectures exist, for example adding a "hyper-autoencoder" (hyper-prior) to the network in order to jointly learn the latent distribution properties of the encoder output. Any embodiment described in the following is not limited to the use of autoencoders. Any end-to-end differentiable codec can be considered.

To remove the redundancies between frames of video sequences, traditional video coding methods include inter prediction tools. The images are partitioned into blocks.

For each block to be encoded, a motion estimator tries to find a predictor in a previously reconstructed reference picture. Translation is traditionally considered, the motion estimator searches among blocks of the same shape within a window co-located with the current block to predict. When the best match is found, the motion vector, i.e., the horizontal and vertical coordinate differences between the current block's location and its predictor, is coded and transmitted in the bitstream with the index of the reference picture. The difference between the source block and the predictor, also called residual, is generally transformed, quantized and entropy coded in the bitstream.

At the decoder, the motion information as well as the residuals are decoded. The predictor is accessed in the signaled reference frame, using the decoded motion vector. The decoded block is then constructed by adding the decoded residual to the predictor.

In such a scheme, the encoder performs the complex task of finding a best-matching block within a window in the reference frame, centered at the current block's location. The decoder just needs to parse the motion information.

Several temporal structures enable the encoder to select a reference frame among previously decoded pictures. A typical structure that is used in a broadcast ecosystem is named Random Access Structure. It is composed of periodic Groups of Pictures (GOPs) which comprise the minimal temporal timeframe structure, that is repeated.

Figure 5:
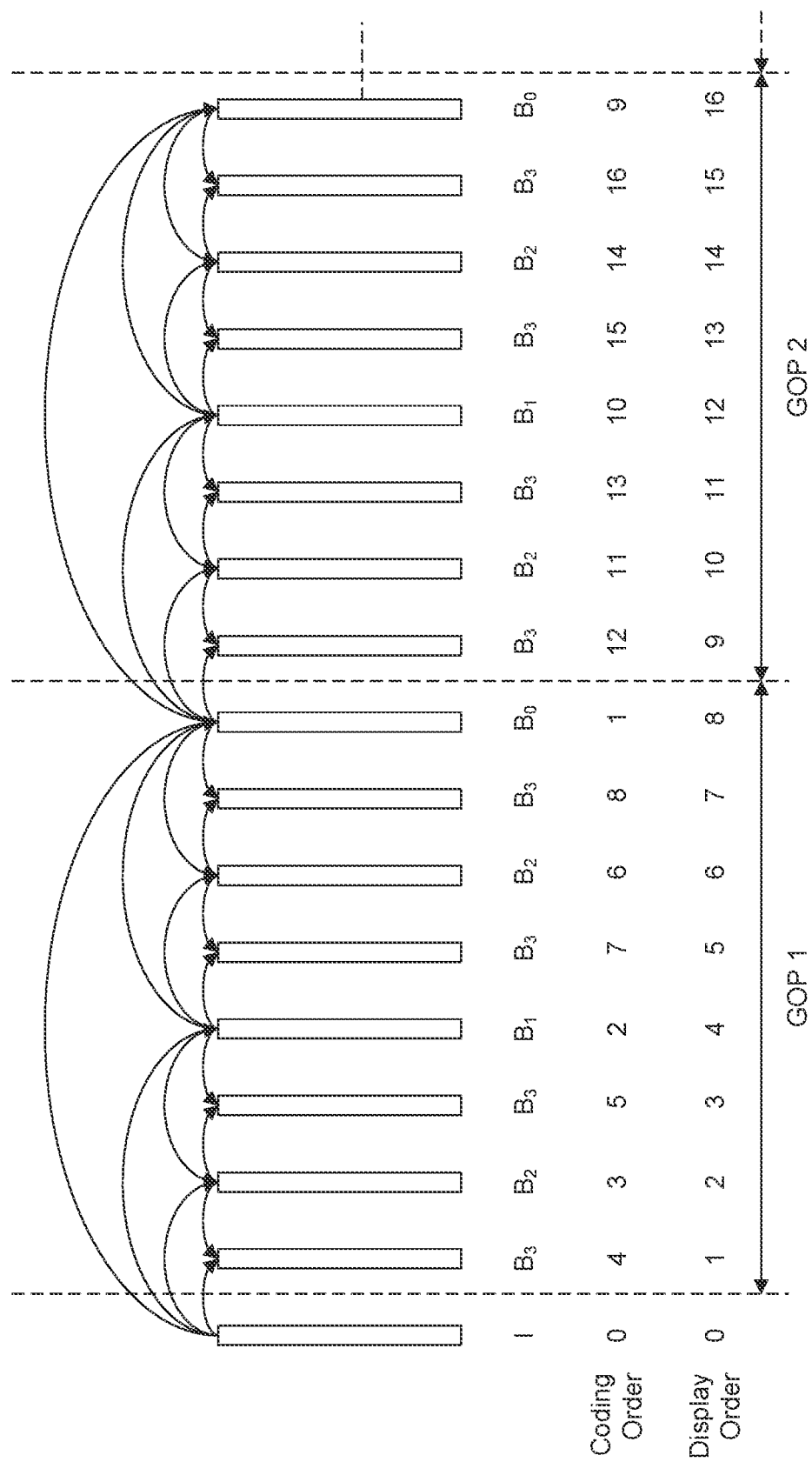
FIG. 5 illustrates an example of a random access structure with a GOP of 8 frames.

FIG. 5 illustrates such a structure in the case of a GOP of 8 frames. The first frame is an Intra frame, or I-frame, meaning that it does not depend on other frames to be decoded. It can then be used as a random-access point, where a decoder can start decoding a sequence. In broadcast, they are typically separated by a second of video, which enables TV viewers to switch channels and start decoding the new channel they selected, and not wait for too long for the video to start being displayed. However, these frames usually cost a lot of bits to transmit since they are not predicted using previously decoded content. In between I frames, the other frames are predicted using previously decoded frames. In the structure of FIG. 5, one can notice that the coding order is different from the order of display. This enables the encoder to predict the frames using past and future previously reconstructed pictures. These frames are hence called B frames for bi-directional prediction. Then, the structure follows a hierarchical pattern with frames of type $B_0$, $B_1$, $B_2$, and $B_3$. The $B_0$ of each GOP is the first frame to be coded, it is predicted using the last key frame (I or $B_0$) from previous GOPs, e.g., frame 8 in display order is predicted from frame 0. The following frames in coding order can be predicted using past and future frames, as depicted by the arrows. Frames $B_1$ can use frames of type I, $B_0$, frames $B_2$ can be predicted from frames I, $B_0$ and $B_1$ etc. The distance between the current frame and the reference frame then varies depending on the decisions made by the encoder.

Other GOP structures exist, this example shows the possible dependencies between frames at different distances between reference and predicted, which dramatically improve the coding efficiency. In the above example, when the motions in the scene are not too fast and erratic and there are no scene cuts, $B_3$ pictures cost very few bits as they are mostly interpolated from neighboring frames.

Figure 6:
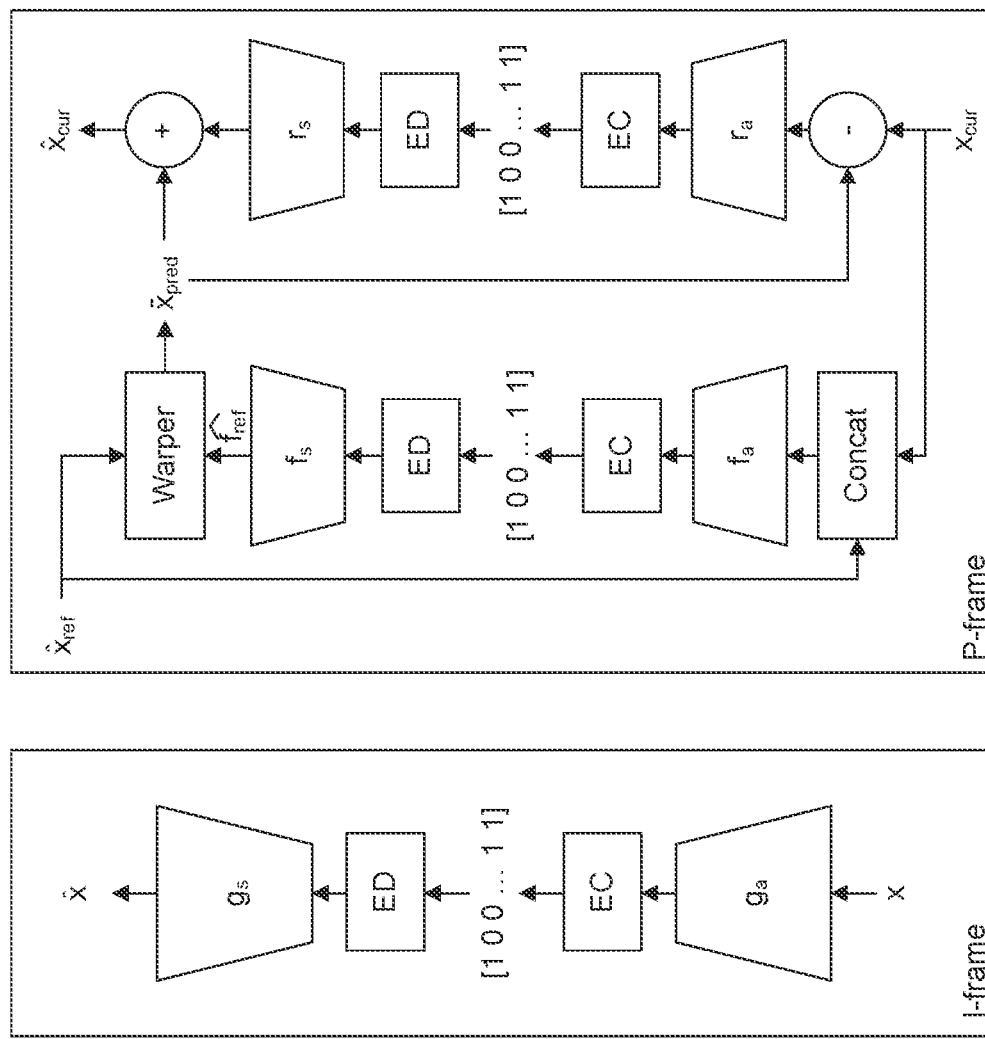
FIG. 6 illustrates an example of an architecture by Agustsson et al. for compressing video frames.

In relation with FIG. 6, an example of a video compression method based on artificial neural networks is described. Such kind of video compression methods rely on autoencoder architectures to encode the different elements and tackle the removal of inter-frame redundancies by computing an optical flow, which estimates a dense motion flow between frames, i.e., each pixel location is assigned a distinct 2d motion vector (horizontal and vertical).

Coupled with traditional block based inter prediction and residual coding, optical flow has so far failed to show benefits over the previously described block-based methods at a reasonable complexity. However, recent works using autoencoders to encode the motion fields have shown promising results.

FIG. 6 shows a general architecture presented in "Scale-space flow for end-to-end optimized video compression", E. Agustsson. D. Minnen, N. Johnston, J. Ballé, S. J. Hwang, G. Toderici, CVPR 2020. The I-frame block on the left represents the encoding of key-frames which are independently encoded (Intra). This block includes of an auto-encoder, composed of convolutional analysis and synthesis modules, as developed for ANN-based image compression. At the inference, an Entropy Coder (EC) and an Entropy Decoder (ED) are used to arithmetically remove redundancies.

Predicted frames (P) are encoded following the process on the right. At the encoder, the inputs are the current frame $x_{cur}$ and a previously reconstructed reference frame $\hat{x}_{ref}$. Both images are used to derive and encode the motion information. They are concatenated as a unique tensor which is the input of the motion flow autoencoder ($f_a$, $f_s$) which produces a reconstructed flow $\widetilde{f_{ref}}$. The latter is used to warp the reference frame $\hat{x}_{ref}$ onto the current, since the decoder will have access to the reconstructed flow only. This produces a predictor for the current frame $\bar{x}_{pred}$. The residual, corresponding to $x_{cur}-\bar{x}_{pred}$ is then encoded by ($r_a$, $r_s$). The reconstructed residual is finally added to the reconstructed prediction to form the decoded image $\hat{x}_{cur}$.

The bitstream, denoted by [1 0 0 . . . 1 1] in FIG. 6 is then composed of binary codes representing either the latent representation of I-frames, or the latent representations of the motion field and the residuals in the case of predicted frames.

In traditional compression, the encoder can select among lists of modes for prediction, transform, quantization, to generate an optimized bit-stream for a given content. In end-to-end compression, the concept of coding modes is absent, and it is expected that the artificial neural network-based encoder, which performs nonlinear transform coding in most cases, generates the best compressible latent representation under the rate-distortion constraint it was trained with.

As described above, the weights/parameters of the modules are learned during training and then deployed for inference. One major limitation of these approaches is that the trained models need to be able to handle all types of images/videos.

According to an aspect of the present principles, a method and an apparatus for compressing images or videos using adaptable or parametrized neural-network decoders are provided. It is thus proposed to use a differentiable side-information channel to use additional (encoded) parameters to parametrize the decoder for the encoded latent(s) of the content. Such a scheme allows to bring a similar concept of modes to end-to-end compression.

End-to-end compression relies on learned analysis and synthesis nonlinear transforms and don't provide any adaptability mechanisms. This is especially a concern for targeting multiple bitrates, as deploying multiple models of millions of parameters is not practical for most video applications. Some solutions have been proposed, like conditioning the transforms by rescaling the intermediary feature maps with learned coefficients (by layers) or learning normalization layers per bitrate and switching them on the fly. However, this is limited to the use case of bitrate targeting and can only affect the feature maps scaling, with would have limited effects to improve the compression efficiency.

According to the present principles, methods and apparatus for coding/decoding images/video are provided to improve end-to-end compression by sending additional side-information alongside the bitstream to (re)parametrize parts of the decoder network. The overall architecture is similar to other existing end-to-end compression methods.

According to an embodiment, an additional encoder/decoder network is used on top of a main auto-encoder to learn the side information that is used to parametrize the decoder when decoding the bitstream comprising the image/video coded data. The use of a second auto-encoder on top of the main encoder to learn the side information required allows improving the compression efficiency. This allows to keep a decoder of reasonable size and complexity, which can efficiently compress a large variety of contents.

Let us note $g_a( )$ the analysis transform (encoder), $g_s( )$ the synthesis transform (decoder), X an input image, Z the latent outputted by the encoder, Q a quantization operator, $\hat{X}$ the reconstructed image. An end-to-end compression using a neural network-based encoder and a neural network-based decoder can be expressed as:

$g_a(X)=Z$, corresponding to the latent generation (encoding)

$g_s(Q(Z))=\hat{X}$ corresponding to the reconstruction of the image from the quantized latent Q(Z) (decoding)

In the setting above, the decoder is fixed and applies the same operations to every input.

According to the present principles, additional convolutions/deconvolutions are added to the main auto-encoder.

According to an embodiment, an additional network is learned, with $f_a( )$ and $f_s( )$ two analysis and synthesis transforms, W the side information latent outputted from by the additional encoder network, P a parametrization operator.

According to an embodiment, the end-to-end compression can be expressed as:

$g_a(X)=Z$, corresponding to the main latent comprising the image/video coded data $f_g(Z)=W$, corresponding to the side information latent $\hat{W}=f_s(Q(W))$, corresponding to the reconstructed side information from the quantized latent, $P(g_s, \hat{W})(\hat{Z})=\hat{X}$, corresponding to the reconstructed image/video from the quantized latent ($\hat{Z}$) using the neural network-based decoder adapted with the reconstructed side-information $\hat{W}$.

$f_a$, $f_s$ can be any type of compatible networks. Here, it is proposed to use convolutions/deconvolutions for $f_a$ and $f_s$, respectively, with a final flattening operation and some dense layers, such as fully connected layers, operations added to $f_s$ to generate a vector (1d) from the features map (2d). Nonlinear and/or normalization operations can also be used (e.g.: ReLU, BatchNorm) to improve the network performances.

By choosing a differentiable operator P, the decoder can now be parametrized at runtime for each encoded content.

Figure 7:
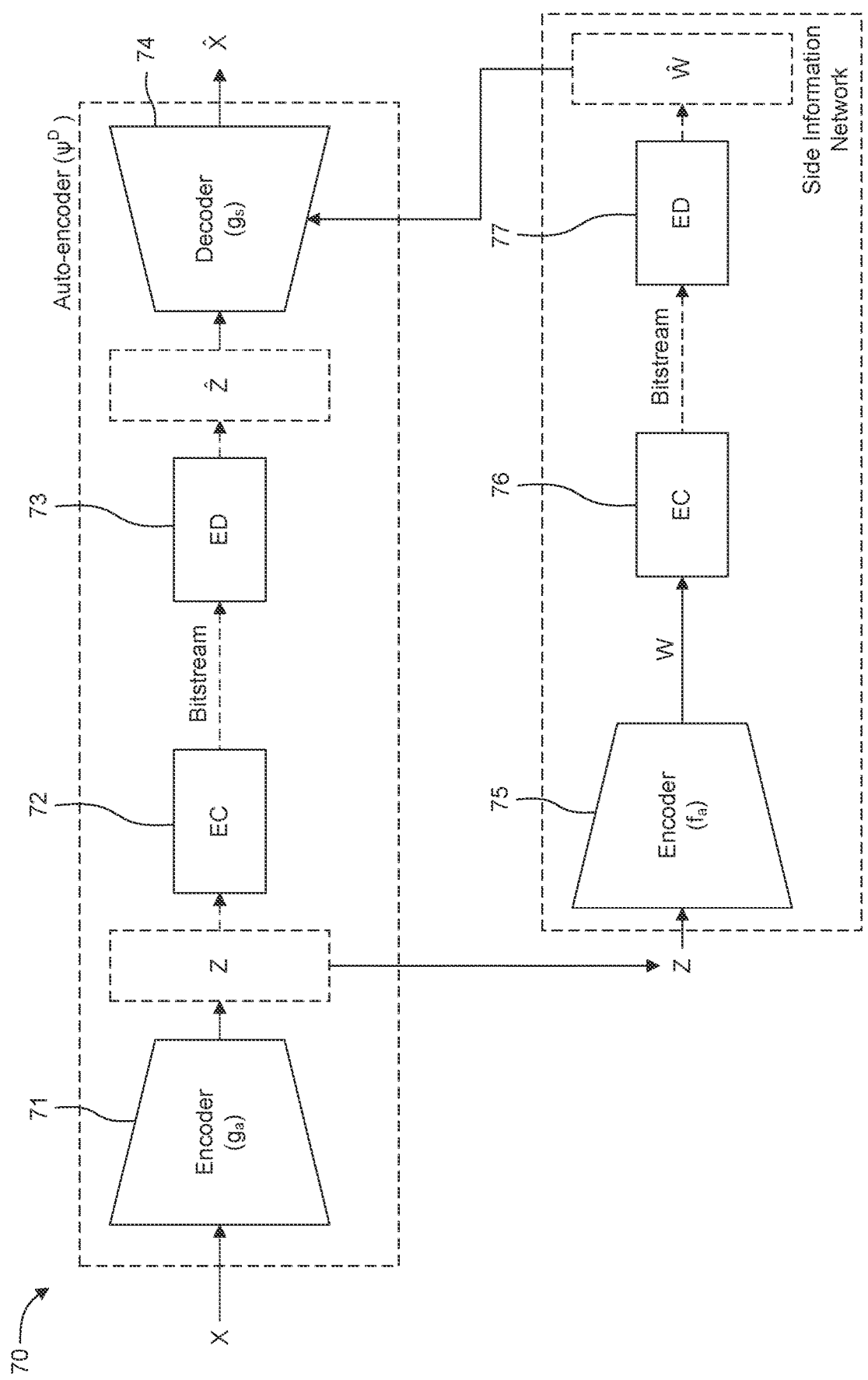
FIG. 7 illustrates an example of an auto-encoder based on an Artificial Neural Network according to an embodiment of the present principles.

FIG. 7 illustrates an example of an auto-encoder 70 based on Artificial Neural Network according to an embodiment of the present principles.

The input tensor X (comprising image or video to encode) is fed into the neural network-based encoder 71. For instance, the encoder network 71 is a sequence of convolutional layers with activation functions.

A first latent Z comprising coded data representative of the image/video is output by the encoder network 41. The first latent Z is then quantized (not shown) and entropy coded (EC, 72) to generate a binary stream (bitstream) for storage or transmission.

The first latent is provided as input to a second neural network-based encoder 75 to generate side-information that are further used for adapting the neural-network decoder when decoding the first latent Z.

A second latent W is output from the second neural-network-based encoder 75. The second latent is quantized (not shown) and entropy-coded 76 to generate a binary stream. The second latent can be encoded in a same bitstream as the first latent or in a separate bitstream.

The streams comprising the first and second latents are stored or transmitted to a receiver.

Once received, the bitstream comprising the first latent is entropy decoded (ED, 73) to obtain $\hat{Z}$, the quantized version of Z.

The bitstream comprising the second latent is entropy decoded (ED, 77) to obtain $\hat{W}$, the quantized version of W. The reconstructed second latent $\hat{W}$ is provided as input to the neural-network-based decoder 74, with the entropy-decoded first latent $\hat{Z}$. The second latent $\hat{W}$ comprises side-information that allows to adapt the neural-network-based decoder 74.

The decoder network 74 generates the reconstruction of the image/video $\hat{X}$.

According to this embodiment, the first neural-network encoder 71, the first neural-network decoder 74, and the second neural-network encoder 75 are trained jointly, with a loss function, and using a generic data set for instance.

Figure 8:
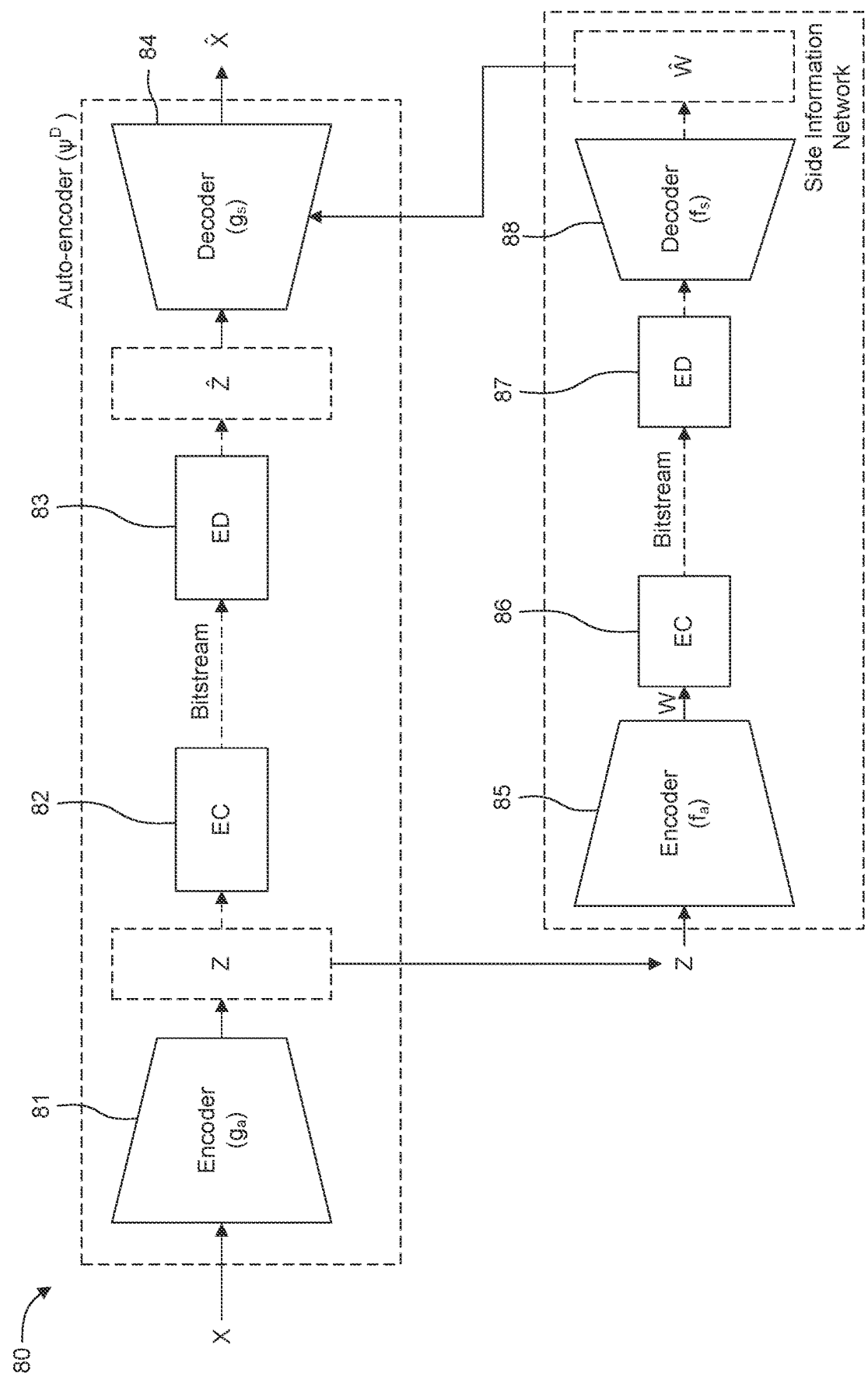
FIG. 8 illustrates an example of an auto-encoder based on an Artificial Neural Network according to another embodiment of the present principles.

FIG. 8 illustrates an example of an auto-encoder 80 based on Artificial Neural Network according to another embodiment of the present principles. References 81-87 are similar respectively to the references 71-77 from FIG. 7. In the embodiment described in FIG. 8, a neural-network-based decoder 88 is added after the entropy-decoder 87 of the side-information latent $\hat{W}$.

According to this embodiment, the first neural-network encoder 81, the first neural-network decoder 84, the second neural-network encoder 85 and the second neural-network decoder 88 are trained jointly, with a loss function, and using a generic data set for instance.

More sophisticated architectures can also be used, for example a "hyper-autoencoder" (hyper-prior) can be added to the network in order to jointly learn the latent distribution properties of the encoder output.

Figure 9:
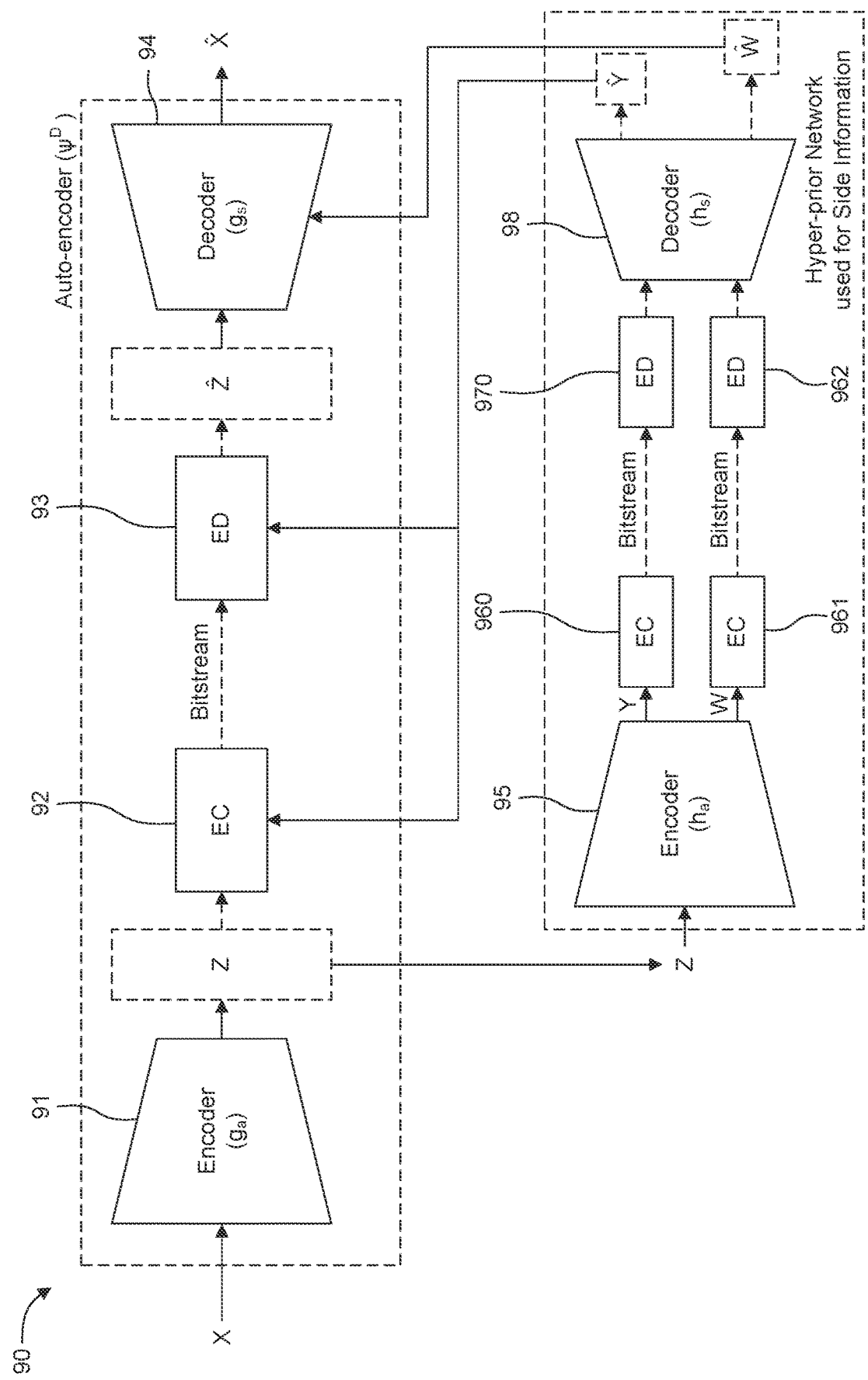
FIG. 9 illustrates an example of an auto-encoder based on an Artificial Neural Network according to another embodiment of the present principles.

FIG. 9 illustrates an example of an auto-encoder based on Artificial Neural Network according to another embodiment of the present principles. According to the embodiment, the side-information is generated from a hyper-prior network.

Hyperprior networks have been extremely successful for end-to-end compression in the recent years. An additional auto-encoder network is learned alongside the main auto-encoder to predict the parameters of a parametric distribution function. For example, each latent element can be encoded as a Gaussian or Laplacian distribution, with the parameters (e.g.: mean/loc scale/std for the Gaussian) predicted from the hyperprior decoder.

According to this embodiment, the hyperprior network is re-used to learn the side information. As illustrated in FIG. 9, references 91-95, 961, 962 are similar respectively to the references 71-77 from FIG. 7.

The first latent Z output by the encoder 91 is provided as input to the hyper-prior neural network-based encoder 95 which generates a latent Y corresponding to the learned parameters of the first latent distribution and another latent W comprising the side-information that is further used for adapting the neural-network decoder when decoding the first latent Z. Each latent W and Z is entropy-coded (EC, 960, 961).

On the decoding side, the latents are entropy-decoded (ED, 970, 971) and provided as inputs to the hyper-prior decoder 98. The hyperprior decoder 98 is modified to have a second branch that is used to decode the side information latent needed by the decoder to modify 94.

The first branch of the hyper-prior decoder 98 provides the parameters of the first latent Z distribution to the entropy-decoder 93 for entropy-decoding the first latent Z.

Note that this is proposed to reduce the memory and complexity footprint of the encoder. In some usages, it might make sense to have both a hyperprior and a side-information network operating separately.

According to this embodiment, the first neural-network encoder 91, the first neural-network decoder 94, the hyperprior neural-network encoder 95 and the hyperprior neural-network decoder 98 are trained jointly, with a loss function, and using a generic data set for instance.

Figure 10:
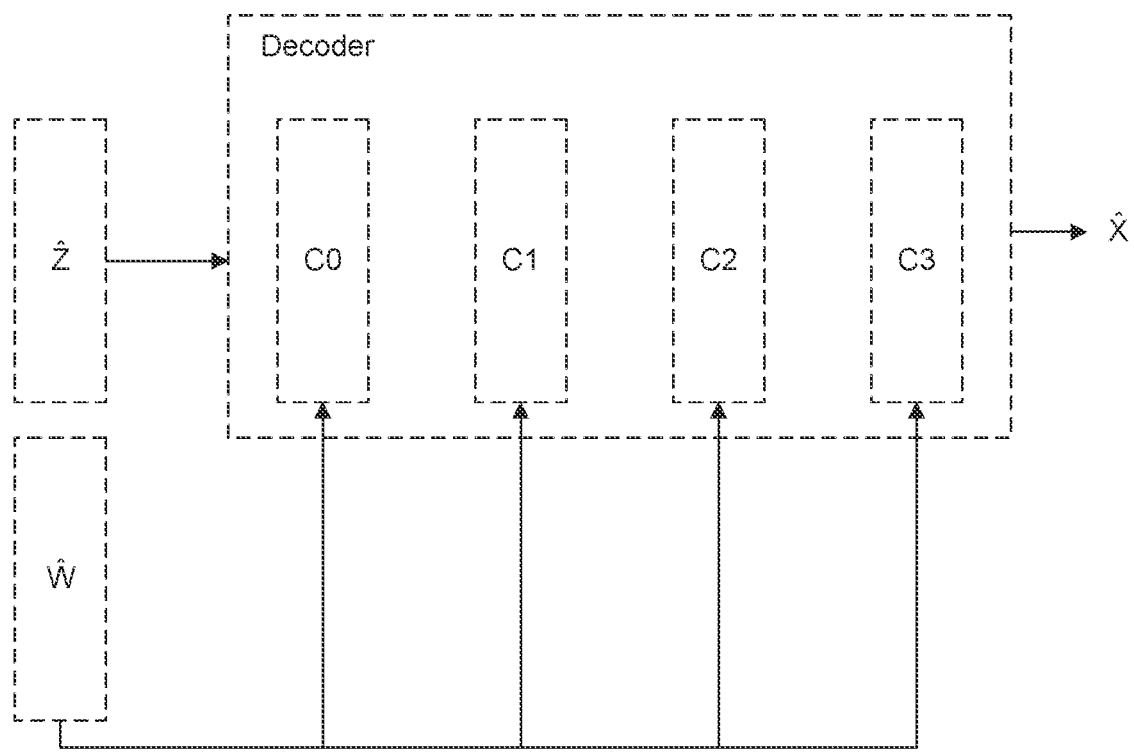
FIG. 10 illustrates an example of an adaptation of an Artificial Neural Network-based decoder according to an embodiment of the present principles.

FIG. 10 illustrates an example of an adaptation of an Artificial Neural Network-based decoder according to an embodiment of the present principles. The Artificial Neural Network-based decoder can be the decoder 74, 84, 94 as illustrated in FIG. 7-9 for instance.

According to a variant, the differentiable operator P that adapts the first decoder comprises modulated convolution. In this variant, at least one convolution of the first decoder is modified by multiplying its weights with a projected vector from the side information vector $\hat{W}$.

For example, at least one dense layer of the side-information decoder can be learned to transform the side information latent to a vector that can be applied to the layers of the first decoder to adapt. In other words, the side-information latent is decoded and projected to a vector according to the first decoder structure. The projected vector thus comprises a number of k vectors, with k being the number of layers of the decoder to adapt, each one of the k vectors comprises weights to multiply with the weights of the corresponding layers of the decoder. Some normalization can also be added to prevent the weights from overflowing (e.g.: a l2 norm).

FIG. 10 illustrates the update of the decoder wherein each layer C0-C3 of the decoder is adapted with a corresponding vector from the side information vector $\hat{W}$.

According to another variant, the differentiable operator P that adapts the first decoder comprises conditional convolution filters. In this variant, at least one convolution of the neural network first decoder to adapt is learned to have not one set of weights but N set of weights.

During inference, the side information vector is projected to a vector of size N and activated/normalized to be in the range [0, 1] (e.g.: with a SoftMax operation) for each set of weights, at each parametrizable layer C0-C3 of the decoder. For each parametrizable convolution, during inference, the weights are derived from the trained set of weights multiplied by the vector of size N and aggregated (sum). The features maps are then convolved by these weights derived at inference/runtime.

It is to be noted that not all the layers in the decoder need to be parametrizable. In some embodiments, at least one layer is parametrized.

According to another embodiment, the parametrization is not required, and the network can be used without it if it has been trained as such.

In some embodiments, the present principles is extended to video by having a same type of parametrization for all blocks of an auto-encoder, e.g.: keyframe, flow, residual, etc., as shown in FIG. 6. According to this embodiment, the side-information encoded along with the coded bitstream can apply to any neural-network-based part of a video decoder, such as the I-frame block, flow block or residual block of FIG. 6 for instance. Thus, according to this embodiment, the side-information is generated from the latent provided by any one of the neural-network-based part of the encoder (e.g. $g_a$, $f_a$, $r_a$ in FIG. 6) and used for adapting the corresponding neural network-based decoder (e.g. $g_s$, $f_s$, $r_{s\,in}$ FIG. 6).

Figure 11:
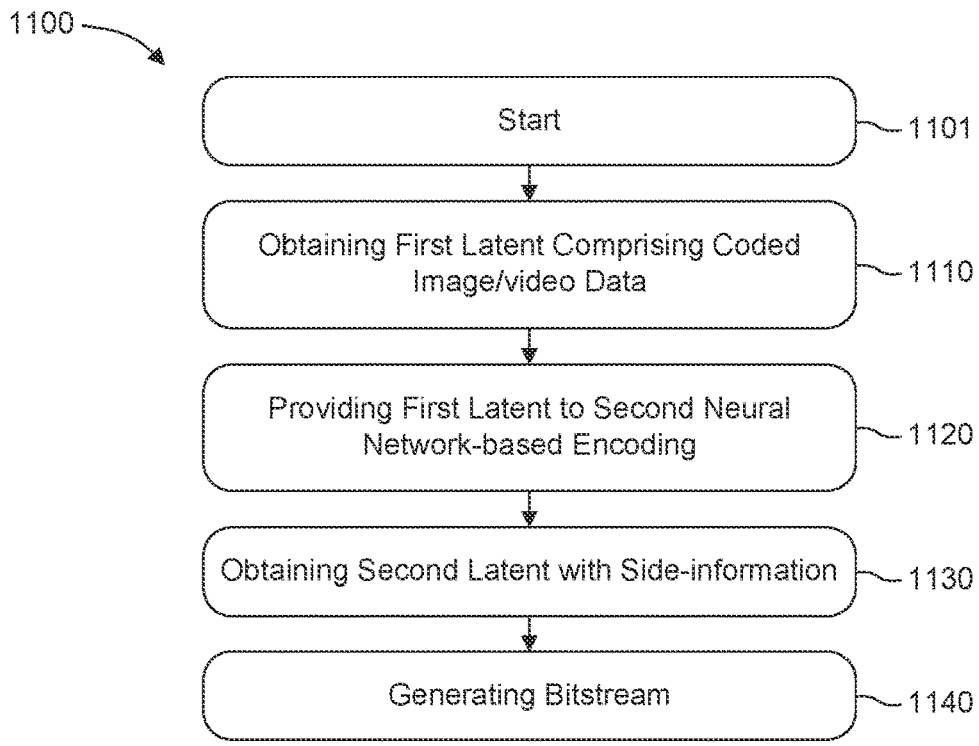
FIG. 11 illustrates an example of a method for coding an image or video according to an embodiment of the present principles.

FIG. 11 illustrates an example of a method for coding image or video according to an embodiment of the present principles. Operation starts at 1101 wherein images or video to encode are provided to a first neural-network-based encoder. At 1110, at least one first latent comprising coded data representative of the image or video is obtained from the first neural-network-based encoder. At 1120, the at least one first latent is provided to a second neural-network encoder. At 1130, at one second latent is obtained from the second neural-network encoder. The at least one second latent comprises side-information for adapting a first neural network-based decoder when the first neural network-based decoder decodes the at least one first latent to reconstruct the input image or video. At 1140, the at least one first latent and the at least one second latent are entropy-coded to generate at least one bitstream. Depending on embodiments, coded image or video data and side-information can be coded in a same bitstream or in separate bitstreams.

In a variant, the first latent is entropy-coded based on parameters predicted from an hyperprior network decoder. In a further variant, the second neural-network-based decoder corresponds to the hyperprior network decoder. Thus, in this further variant, the hyperprior network decoder has two output branches, one branch that provides prediction of distribution parameters of the first latent and one branch that provides a latent comprising the side-information for adapting the first neural-network-based decoder.

Figure 12:
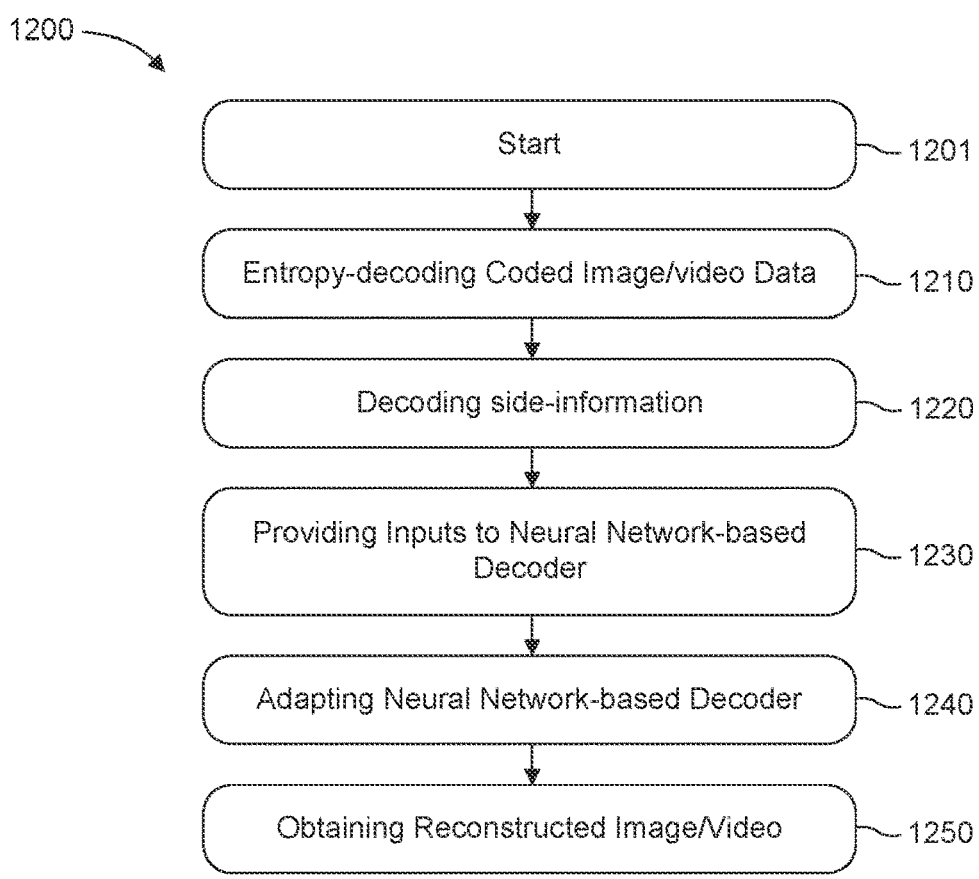
FIG. 12 illustrates an example of a method for decoding an image or video according to an embodiment of the present principles.

FIG. 12 illustrates an example of a method for decoding image or video according to an embodiment of the present principles. Operation starts at 1201 wherein at least one bitstream is obtained, e.g., received from a communication channel or retrieved from a memory. At 1210, coded data representative of image or video is entropy-decoded from the bitstream, providing a first latent. At 1220, side-information is decoded from the bitstream. The side-information allows for adapting a first neural network-based decoder. At 1230, the decoded side-information and the first latent comprising the entropy-decoded image or video are provided as inputs to the first neural-network-based decoder. At 1240, the first neural network-based decoder is adapted using the side-information when the first latent is decoded/transformed using the first neural network-based decoder. At 1250, the reconstructed image or video is obtained from an output of the first neural network-based decoder.

According to a variant, at 1220, side-information is decoded from the bitstream as a tensor comprising at least one item of information for adapting the neural network-based decoder. In this variant, on the encoder side, side-information is encoded/transformed in a latent using a neural-network-based encoder and entropy-coded using an arithmetic encoder for instance. On the decoder side, at 1220, the coded data representative of the side-information is entropy-decoded from the bitstream.

According to a further variant, at 1220, after entropy-decoding, the latent comprising data representative of the side-information is provided as input to a second neural-network-based decoder. The tensor comprising the side-information for adapting the first neural-network-based decoder is thus output by the second neural-network-based decoder.

In a variant, at 1210, entropy-decoding the bitstream to obtain the first latent comprising using parameters predicted from an hyperprior network decoder.

In a further variant, the second neural-network-based decoder corresponds to the hyperprior network decoder. Thus, the latent comprising data representative of the side-information is provided as input to the hyperprior network decoder and the tensor comprising the side-information for adapting the first neural-network-based decoder is output by the hyperprior network decoder.

Figure 13:
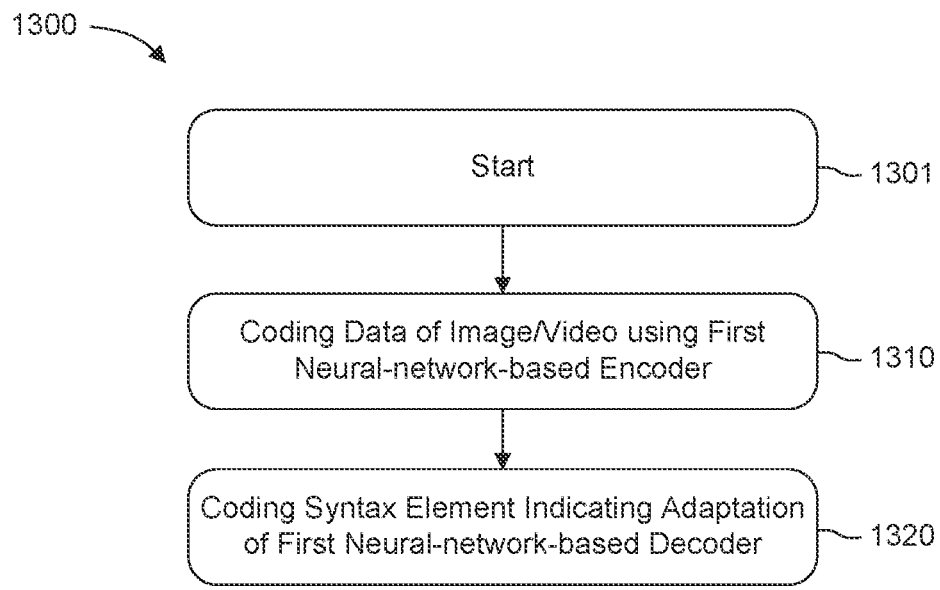
FIG. 13 illustrates an example of a method for coding an image or video according to another embodiment of the present principles.

FIG. 13 illustrates an example of a method for coding image or video according to another embodiment of the present principles. Operation starts at 1301 wherein an image or video to encode is provided as input. At 1310, data representative of the image or video is coded using a first neural-network encoder, and a bitstream comprising the coded data is generated. At 1320, a syntax element is coded in the bitstream, that indicates whether an adaptation of a first neural network-based decoder shall be used when decoding from the bitstream the data representative of the image or video. In other words, for a given image or video to encode, the syntax element allows to switch on or off the use of side-information for adapting the decoder when the image or video is decoded and reconstructed.

Therefore, when it is determined that an adaptation of the first neural network-based decoder shall be used when decoding the data representative of the image or video, any one of the embodiments described above in relation with FIG. 7-11 is performed for encoding the image/video and obtaining the side-information used for adaptation of the decoder.

When it is determined that an adaptation of the first neural network-based decoder is not used when decoding the data representative of the image or video, image/video are encoded using the first neural-network based encoder, e.g., as described in relation with FIG. 4, 6-11 or 12 without the side-information obtention aspect.

Figure 14:
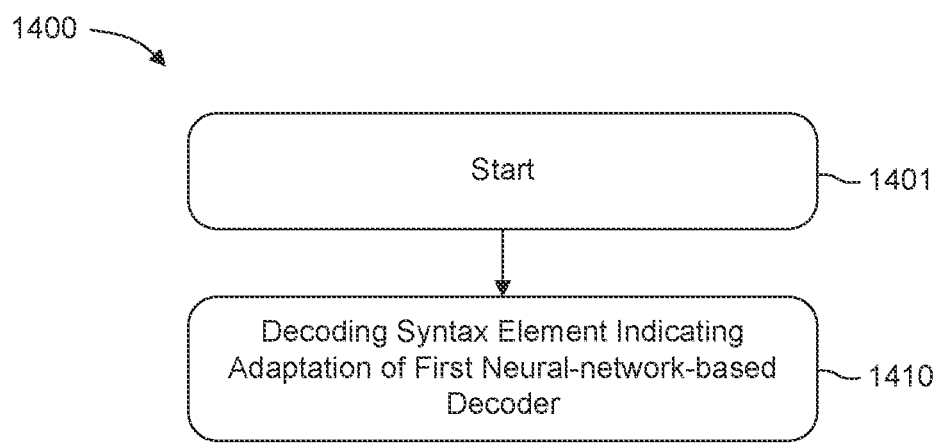
FIG. 14 illustrates an example of a method for decoding an image or video according to another embodiment of the present principles.

FIG. 14 illustrates an example of a method for decoding image or video according to another embodiment of the present principles. Operation starts at 1401 wherein a bitstream to decode is received or retrieved from memory, and provided as input. At 1410, a syntax element is decoded from the bitstream, which indicates whether an adaptation of a first neural network-based decoder is used for decoding at least one latent obtained from the bitstream.

When the syntax element indicates adaptation is used, any one of the embodiments described above in relation with FIG. 7-10 or 12 is performed for decoding and reconstructing the image/video encoded in the bitstream and obtaining the side-information used for adaptation of the decoder when decoding and reconstructing the image/video from the bitstream.

Figure 15:
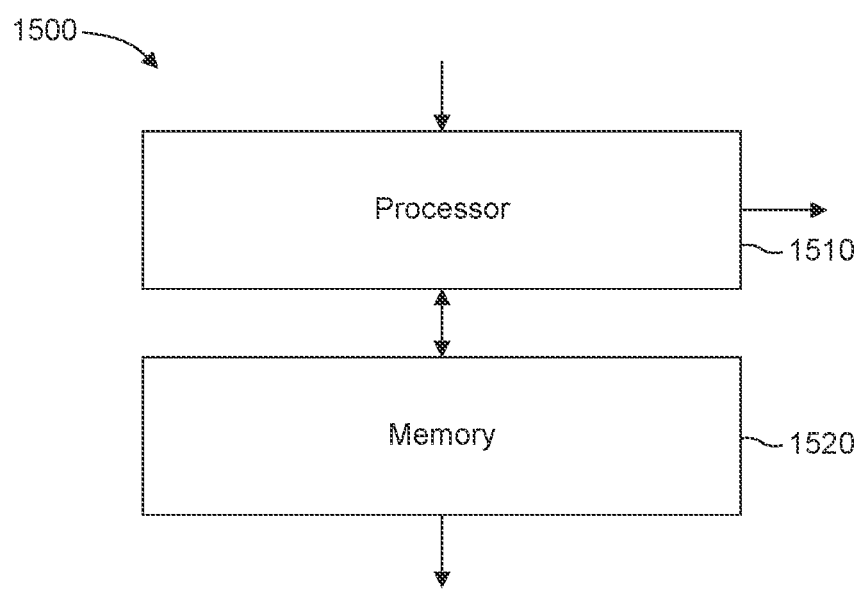
FIG. 15 illustrates one embodiment of an apparatus for encoding or decoding an image or video using the present principles.

FIG. 15 shows one embodiment of an apparatus 1500 for compressing, encoding or decoding image or video using the aforementioned methods. The apparatus comprises Processor 1510 and can be interconnected to a memory 1520 through at least one port. Both Processor 1510 and memory 1520 can also have one or more additional interconnections to external connections.

Processor 1510 is also configured to either insert or receive information in a bitstream and, either compressing, encoding, or decoding using the aforementioned methods.

Syntax

As described above in the aforementioned methods, the decoder parses and decodes the vector that carries the side-information, which drives the parameterization of the decoder.

A syntax element can be added to the High-Level Syntax to switch on/off the re-parameterization. As mentioned above, this method can be switched off, the decoder then corresponds to a pretrained basic model.

A syntax structure, or set of flags, can also be added to specify which layers to re-parameterize. These elements can be set at sequence level (Sequence Parameters Set) or at picture level (Picture Parameters Set).

Figure 16:
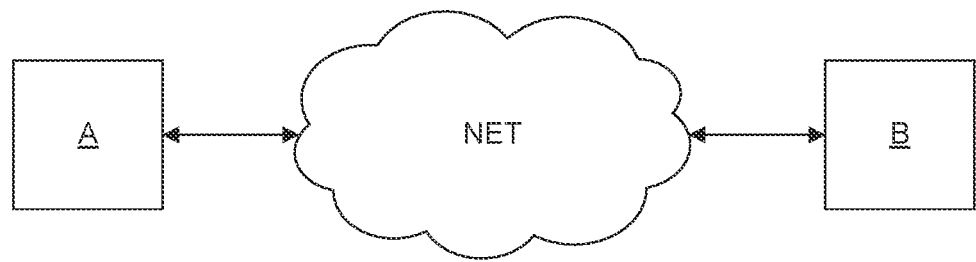
FIG. 16 shows two remote devices communicating over a communication network in accordance with an example of present principles.

FIG. 16 shows two remote devices communicating over a communication network in accordance with an example of present principles.

Figure 17:
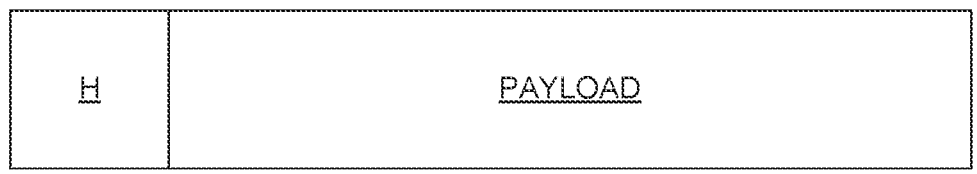
FIG. 17 shows the syntax of a signal in accordance with an example of present principles.

FIG. 17 shows the syntax of a signal in accordance with an example of present principles.

According to an example of the present principles, illustrated in FIG. 16, in a transmission context between two remote devices A and B over a communication network NET, the device A comprises a processor in relation with memory RAM and ROM which are configured to implement a method for encoding an image or a video as described using the aforementioned methods and the device B comprises a processor in relation with memory RAM and ROM which are configured to implement a method for decoding an image or a video as described using the aforementioned methods. In accordance with an example, the network is a broadcast network, adapted to broadcast/transmit encoded side-information along with encoded image or video from device A to decoding devices including the device B.

A signal, intended to be transmitted by the device A, carries at least one bitstream comprising coded data representative of an image or a video and side-information as explained above. The bitstream may comprise syntax elements for the side-information according to any one of the embodiments described above.

According to an embodiment, this signal may also carry-on coded data representative of an image or a video. FIG. 17 shows an example of the syntax of such a signal when the side-information is transmitted over a packet-based transmission protocol. Each transmitted packet P comprises a header H and a payload PAYLOAD. According to embodiments, the payload PAYLOAD may comprise at least one of the following elements:

A syntax element indicating a use of a parameterization of a first neural network-based decoder configured for decoding at least one latent obtained from the bitstream, at least one syntax element indicating a layer of the first neural network-based decoder to adapt when decoding the coded data representative of the image or video.

According to an embodiment, the payload comprises coded data representative of an image or a video encoded according to any one of the embodiments described above.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this application can be used to modify modules, of a video encoder 200 and decoder 300 as shown in FIG. 2 and FIG. 3 or an image or video auto-encoder 40, a neural-network based block as shown in FIG. 4 or 6. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

This disclosure has described various pieces of information, such as for example syntax, that can be transmitted or stored, for example. This information can be packaged or arranged in a variety of manners, including for example manners common in video standards such as putting the information into an SPS, a PPS, a NAL unit, a header (for example, a NAL unit header, or a slice header), or an SEI message. Other manners are also available, including for example manners common for system level or application level standards such as putting the information into one or more of the following:

a. SDP (session description protocol), a format for describing multimedia communication sessions for the purposes of session announcement and session invitation, for example as described in RFCs and used in conjunction with RTP (Real-time Transport Protocol) transmission.
b. DASH MPD (Media Presentation Description) Descriptors, for example as used in DASH and transmitted over HTTP, a Descriptor is associated to a Representation or collection of Representations to provide additional characteristic to the content Representation.
c. RTP header extensions, for example as used during RTP streaming.
d. ISO Base Media File Format, for example as used in OMAF and using boxes which are object-oriented building blocks defined by a unique type identifier and length also known as 'atoms' in some specifications.
e. HLS (HTTP live Streaming) manifest transmitted over HTTP. A manifest can be associated, for example, to a version or collection of versions of a content to provide characteristics of the version or collection of versions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

- Creating and/or transmitting and/or receiving and/or decoding a bitstream or signal that includes one or more of the described syntax elements, or variations thereof.
- Creating and/or transmitting and/or receiving and/or decoding according to any of the embodiments described.
- A method, process, apparatus, medium storing instructions, medium storing data, or signal according to any of the embodiments described.
- A TV, set-top box, cell phone, tablet, or other electronic device that performs adaptation of the NN decoder according to any of the embodiments described.
- A TV, set-top box, cell phone, tablet, or other electronic device that performs adaptation of the NN decoder according to any of the embodiments described, and that displays (e.g. using a monitor, screen, or other type of display) a resulting image/video.
- A TV, set-top box, cell phone, tablet, or other electronic device that selects (e.g. using a tuner) a channel to receive a signal including an encoded image, and performs adaptation of the NN decoder according to any of the embodiments described.
- A TV, set-top box, cell phone, tablet, or other electronic device that receives (e.g. using an antenna) a signal over the air that includes an encoded image/video, and performs adaptation of the NN decoder according to any of the embodiments described.

The invention claimed is:

1. A method, comprising:
   obtaining from a bitstream a latent code comprising coded data representative of an image or a video;
   obtaining from the bitstream or a separate bitstream, side-information data;
   deriving at least one weight of at least one layer of a first neural network of an image or video decoder using the side-information data providing a parametrized first neural network; and
   obtaining a reconstructed image or video as output of the parametrized first neural network taking as input the latent code comprising coded data representative of the image or video.

2. The method of claim 1, wherein the side-information data is a tensor comprising at least one item of information for adapting the first neural network.

3. The method of claim 1, wherein obtaining from the bitstream comprises entropy-decoding the bitstream.

4. The method of claim 2, wherein obtaining the side-information data comprises obtaining the tensor from an output of a second neural network-based decoder.

5. The method of claim 2, wherein deriving at least one weight of at least one layer of the first neural network comprises multiplying the at least one weight with at least one item of the tensor.

6. The method of claim 1, wherein the first neural network is one of the following:
   an intra coded frame decoder;
   a motion flow decoder; or
   a residual decoder.

7. The method of claim 1, wherein obtaining the latent code comprising the coded data representative of the image or video comprises entropy-decoding the bitstream using parameters predicted from an hyperprior network decoder.

8. The method of claim 7, wherein the side-information data is obtained from the bitstream using the hyperprior network decoder.

9. The method of claim 1, comprising decoding from the bitstream a syntax element indicating whether of the parameterized first neural network is used for decoding the latent code obtained from the bitstream.

10. A non-transitory computer readable medium having stored thereon instructions for causing one or more processors to perform the method of claim 1.

11. The method of claim 1, wherein the side-information data is projected into a vector of a size N, N being an integer and the at least one layer has N of sets of the derived at least one weight, and wherein the at least one weight of at least one layer of the first neural network is derived as a sum of the N at least one weight from the sets multiplied by the vector.

12. An apparatus comprising one or more processors operable to:
    obtain from a bitstream a latent code comprising coded data representative of an image or a video;
    obtain from the bitstream or a separate bitstream, side-information data;
    derive at least one weight of at least one layer of a first neural network of an image or video decoder using the side-information data providing a parametrized first neural network; and
    obtain a reconstructed image or video as output of the parametrized first neural network taking as input the latent code comprising coded data representative of the image or video.

13. The apparatus of claim 12, wherein the one or more processors are configured to decode from the bitstream a syntax element indicating whether a parametrization of the parameterized first neural network is used for decoding the latent code obtained from the bitstream.

14. The apparatus of claim 12, comprising at least one of: (i) an antenna configured to receive a signal, the signal including a bitstream; a band limiter configured to limit the received signal to a band of frequencies that includes the bitstream; or a display configured to display the reconstructed image or video.

15. The apparatus of claim 14, comprising a television, a cell phone, a tablet, or a set top box.

16. The apparatus of claim 12, wherein the side-information data is projected into a vector of a size N, N being an integer and the at least one layer has N of sets of the derived at least one weight, and wherein the at least one weight of at least one layer of the first neural network is derived as a sum of the N at least one weight from the sets multiplied by the vector.

17. A method, comprising:
    obtaining from a first neural network encoder at least one first latent code comprising coded data representative of an image or a video;
    providing the at least one first latent code to a second neural network encoder;
    obtaining from the second neural network encoder, side-information data for deriving at least one weight of at least one layer of a first neural network of an image or video decoder when decoding the at least one first latent code; and
    generating at least one bitstream comprising the at least one first latent code and the side-information data.

18. The method of claim 17, comprising encoding in the at least one bitstream a syntax element indicating whether a parametrization of the first neural network of an image or video decoder is used for decoding from the bitstream the at least one first latent code comprising data representative of the image or video.

19. An apparatus comprising one or more processors operable to:
   obtain from a first neural network encoder at least one first latent code comprising coded data representative of an image or a video;
   provide the at least one first latent code to a second neural network encoder;
   obtain from the second neural network encoder, side-information data for deriving at least one weight of at least one layer of a first neural network of an image or video decoder when decoding the at least one first latent code; and
   generate at least one bitstream comprising the at least one first latent code and the side-information data.

20. The apparatus of claim 19, wherein the one or more processors are configured to encode in the at least one bitstream a syntax element indicating whether a parametrization of the first neural network of an image or video decoder is used for decoding from the bitstream the at least one first latent code comprising data representative of the image or video.

* * * * *